US009360119B2

(12) United States Patent
Kinback et al.

(10) Patent No.: US 9,360,119 B2
(45) Date of Patent: Jun. 7, 2016

(54) VACUUM ACTUATED FLUID DELIVERY

(75) Inventors: Kevin W. Kinback, Turnersville, NJ (US); James W. Stannard, Pittsgrove, NJ (US)

(73) Assignee: Evoqua Water Technologies LLC, Warrendale, PA (US)

(*) Notice: Subject to any disclaimer, the term of this patent is extended or adjusted under 35 U.S.C. 154(b) by 73 days.

(21) Appl. No.: 12/867,221

(22) PCT Filed: Aug. 19, 2009

(86) PCT No.: PCT/US2009/054363
§ 371 (c)(1),
(2), (4) Date: Dec. 3, 2010

(87) PCT Pub. No.: WO2010/022188
PCT Pub. Date: Feb. 25, 2010

(65) Prior Publication Data
US 2011/0067766 A1    Mar. 24, 2011

Related U.S. Application Data

(60) Provisional application No. 61/090,053, filed on Aug. 19, 2008.

(51) Int. Cl.
*F16K 31/12* (2006.01)
*F16K 1/30* (2006.01)
*C02F 1/76* (2006.01)

(52) U.S. Cl.
CPC .............. *F16K 1/305* (2013.01); *C02F 1/763* (2013.01); *Y10T 29/49412* (2015.01); *Y10T 29/49716* (2015.01); *Y10T 137/7827* (2015.04)

(58) Field of Classification Search
CPC ......... F16K 1/306; F16K 1/307; F16K 1/305; F17C 13/04
USPC .......... 137/494, 496, 607, 613, 907; 251/147, 251/148, 291
See application file for complete search history.

(56) References Cited

U.S. PATENT DOCUMENTS

| 2,674,829 A | | 4/1954 | St. Clair | |
| 2,816,812 A | | 12/1957 | Peck | |
| 3,604,445 A | * | 9/1971 | Jordan et al. | 137/113 |
| 3,746,036 A | | 7/1973 | Du Bois et al. | |
| 3,885,589 A | * | 5/1975 | Iung | 137/613 |

* cited by examiner

*Primary Examiner* — John K Fristoe, Jr.
*Assistant Examiner* — Reinaldo Sanchez-Medina (57) ABSTRACT

The present invention relates to fluid delivery systems comprising valve assemblies that provide for a more stable and reliable delivery system for a fluid, for example a gaseous fluid, from a tank by utilizing vacuum to open the normally closed valves assemblies. The present invention also relates to methods of delivering a fluid from a tank, assembling and operating the valves assemblies, as well as retrofitting existing tanks with such systems.

9 Claims, 6 Drawing Sheets

FIG. 6

VACUUM ACTUATED FLUID DELIVERY

CROSS-REFERENCE TO RELATED APPLICATIONS

This application claims the benefit of U.S. Provisional Application No. 61/090,053, filed Aug. 19, 2008, entitled ALL VACUUM CHLORINE GAS DELIVERY SYSTEM FOR CHLORINE GAS CYLINDERS, which is incorporated herein by reference for all purposes.

BACKGROUND

1. Field of the Invention

The present invention relates to systems comprising valves that provide for a more stable and reliable delivery system for a fluid, for example a gaseous fluid, from a tank or cylinder. The present invention also relates to methods of assembling and operating these valves, as well as retrofitting conventional cylinders with these systems.

2. Description of the Related Art

There are a limited number of disinfection processes that may be used to treat wastewater that are economical. Chlorine ($Cl_2$) and sodium hypochlorite (NaClO) are examples of chemicals that are commonly used to treat wastewater economically. However, there are some problems with delivering these chemicals to the wastewater to be treated. For example, sodium hypochlorite can be difficult to deliver due to outgassing and product degradation. Chlorine may be more cost-effective than sodium hypochlorite, but requires a higher level of operator training and awareness, and also requires that the treatment center comply with local and federal regulations that are specific to chlorine.

SUMMARY OF THE INVENTION

One or more aspects of the present disclosure involve embodiments directed to an assembly for delivering fluid from a tank comprising a valve assembly having a channel in communication with an interior volume of the tank at a first channel end of the channel. The assembly further comprises a regulating assembly coupled to the channel at a second channel end that is distal from the first channel end, the regulating assembly having a seat assembly having an aperture defined by an aperture seating surface; a seating member having a sealing surface, a displacer head, and a biasing end that is distal from the displacer end; and a biasing member coupled to the seating member at the biasing end thereof, the biasing member disposed to position the sealing surface of the seating member against the aperture seating surface of the seat assembly, and fluidly isolate the aperture from the channel. The assembly further comprises an actuator coupled to the valve assembly, and having a vacuum port connectable to a vacuum source, and capable of being in fluid communication with the channel through the aperture; a diaphragm having a first side in communication with the vacuum port; and a displacer having a first displacer end and a second displacer end, the displacer coupled at the first displacer end to the diaphragm, the displacer further coupled at the second displacer end to the displacer head of the seating member.

One or more further aspects of the present disclosure are directed to a fluid delivery system, comprising a tank and a valve assembly having a channel having a first channel end and a second channel end, the channel in fluid communication with an interior volume of the tank at the first channel end; a regulating assembly coupled to the channel at the second channel end, the regulating assembly having a seat assembly having an aperture defined by an aperture seating surface, the aperture in fluid communication with the interior volume of the tank through the channel; a seating member having a sealing surface, a displacer head, and a biasing end that is distal from the displacer end; and a biasing member coupled to the seating member at the biasing end thereof, the biasing member configured to position the sealing surface of the seating member toward the aperture seating surface of the seat assembly. The fluid delivery system further comprises an actuator coupled to the valve assembly, and having a vacuum port connected to a vacuum source with a vacuum pressure, the vacuum source in fluid communication with the interior volume of the tank through the aperture and the channel; a diaphragm having a first side in communication with the vacuum port, and a second side that is exposed to a pressure greater than the vacuum pressure; and a displacer having a first displacer end and a second displacer end, the displacer coupled at the first displacer end to the diaphragm, the displacer further coupled at the second displacer end to the displacer head of the seating member.

One or more further aspects of the present disclosure are directed to a method of delivering fluid from a tank, comprising providing a valve assembly having a channel in communication with an interior volume of the tank at a first channel end of the channel; a regulating assembly coupled to the channel at a second channel end that is distal from the first channel end, the regulating assembly having a seat assembly having an aperture defined by an aperture seating surface; a seating member having a sealing surface, a displacer head, and a biasing end that is distal from the displacer end; and a biasing member coupled to the seating member at the biasing end thereof, the biasing member disposed to position the sealing surface of the seating member against the aperture seating surface of the seat assembly, and fluidly isolate the aperture from the channel. The method further comprises providing a valve assembly having an actuator coupled to the valve assembly, and having a vacuum port, and capable of being in fluid communication with the channel through the aperture; and a diaphragm having a first side in communication with the vacuum port; and a displacer having a first displacer end and a second displacer end, the displacer coupled at the first displacer end to the diaphragm, the displacer further coupled at the second displacer end to the displacer head of the seating member. The method further comprises connecting a vacuum source to the vacuum port, and creating a differential pressure between the first side of the diaphragm and an opposite side of the diaphragm thereby linearly displacing the displacer along a displacement axis and further displacing the sealing surface of the seat assembly from against the aperture seating surface.

One or more further aspects of the present disclosure are directed to a method of assembling a vacuum actuated valve comprising providing a valve body having a channel defined therein, the channel having a first end and a second end; securing a seat assembly in the valve body, the seat assembly having an aperture defined by an aperture seating surface; securing a seating member in the valve body, the seating member having a sealing surface, a displacer head, and a biasing end that is distal from the displacer end; providing a biasing member having a first mounting end and a second mounting end; coupling the seating member at the biasing end thereof to the first mounting end of the biasing member; installing the biasing member in the valve body in a configuration that creates a biasing force directed to the seating member along a direction that positions the sealing surface of the seating member along the aperture seating surface; and providing an actuator having a vacuum port; and a diaphragm having a first side in communication with the vacuum port, and a second side that is open to atmospheric pressure; and a displacer having a first displacer end and a second displacer end; coupling the displacer at the first displacer end to the diaphragm; and coupling the displacer at the second displacer end to the displacer head of the seating member.

One or more further aspects of the present disclosure are directed to a method for retrofitting a tank comprising installing a valve assembly into a port of the tank, the valve assembly having a channel in communication with an interior volume of the tank at a first channel end of the channel; a regulating assembly coupled to the channel at a second channel end that is distal from the first channel end, the regulating assembly having a seat assembly having an aperture defined by an aperture seating surface; a seating member having a sealing surface, a displacer head, and a biasing end that is distal from the displacer end; and a biasing member coupled to the seating member at the biasing end thereof, the biasing member disposed to position the sealing surface of the seating member against the aperture seating surface of the seat assembly, and fluidly isolate the aperture from the channel; and coupling an actuator to the valve assembly, the actuator having a vacuum port connectable to a vacuum source, and capable of being in fluid communication with the channel through the aperture; a diaphragm having a first side in communication with the vacuum port; and a displacer having a first displacer end and a second displacer end, the displacer coupled at the first displacer end to the diaphragm, the displacer further coupled at the second displacer end to the displacer head of the seating member.

One or more further aspects of the present disclosure are directed to a fluid delivery system comprising a vacuum source; a source of fluid to be delivered; flow regulating means fluidly connected to the source of fluid to be delivered, the flow regulating means having a first configuration that fluidly isolates the source of fluid to be delivered from the vacuum source; and actuating means having a diaphragm operatively coupled to and capable of reconfiguring the flow regulating means into a second configuration that creates a flow path fluidly connecting the source of fluid to be delivered to the vacuum source.

One or more further aspects of the present invention are directed to a filling adapter configured to couple with a valve assembly as disclosed herein and fluidly connect a source of a refilling fluid and an interior of a tank or cylinder.

BRIEF DESCRIPTION OF THE DRAWINGS

The accompanying drawings are not intended to be drawn to scale. The identical or nearly identical component or feature that is illustrated in various figures is represented by a like numeral. For purposes of clarity, not every component may be labeled in every drawing, nor is every component of each embodiment of the invention shown where illustration is not necessary to allow those of ordinary skill in the art to understand the invention. In the drawings.

DETAILED DESCRIPTION

The present invention can address concerns associated with the equipment used for storing and delivering a fluid, for example, liquids and/or gases, from a cylinder or tank containing the fluid, through a valve. Specifically, this invention can involve equipment used for storing and delivering gaseous fluids such as chlorine ($Cl_2$), sulfur dioxide ($SO_2$), carbon dioxide ($CO_2$), or ammonia ($NH_3$) from a source such as a cylinder or tank, through a valve assembly and actuator.

In one or more embodiments of this invention, the system, which can include a cylinder containing a fluid to be delivered, a valve assembly, and an actuator, can be operated under a vacuum, without requiring a vacuum regulating valve to maintain the vacuum.

In certain embodiments, the valve may be configured to allow for the stem to require little or no cleaning. The valve assembly can be positioned such that any build-up of contaminants is reduced, and any condensation of liquid within the valve assembly or the valve body can be returned to the cylinder.

Figure 1:
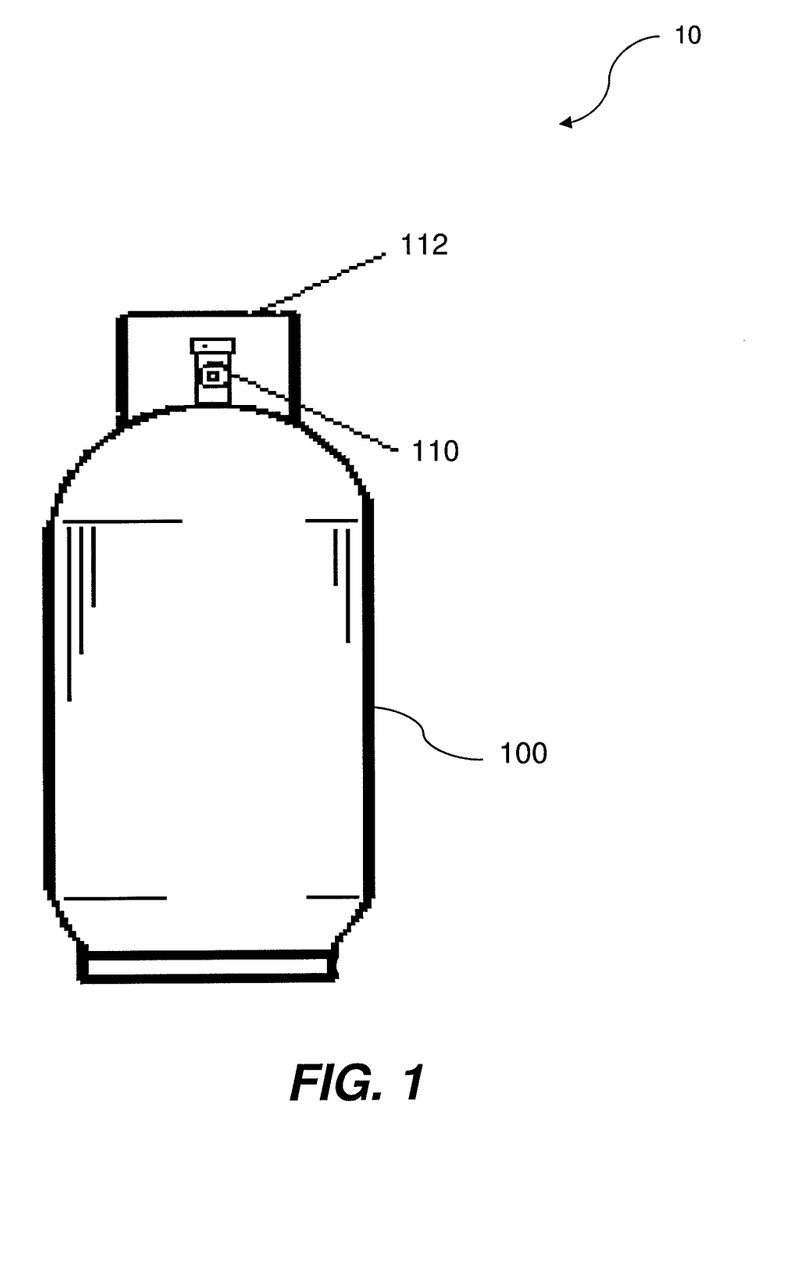
FIG. 1 is schematic illustration showing an example of a fluid delivery system, in accordance with certain embodiments of the present invention.

FIG. 1 exemplarily illustrates an embodiment in accordance with some aspects of the invention. The system 10 comprises cylinder or tank 100, which is connected to valve assembly 110, which can be a vacuum operated or vacuum actuated valve. Protective shield 112 covers valve assembly 110. Valve assembly 110 can be connected, directly or indirectly, to a vacuum source (not shown) in order to deliver a fluid from tank 100. The fluid stored in the tank to be delivered may be liquid or gaseous. For example, the fluid may be liquid or gaseous chlorine, sodium hypochlorite, sulfur dioxide, carbon dioxide, or ammonia.

Figure 2:
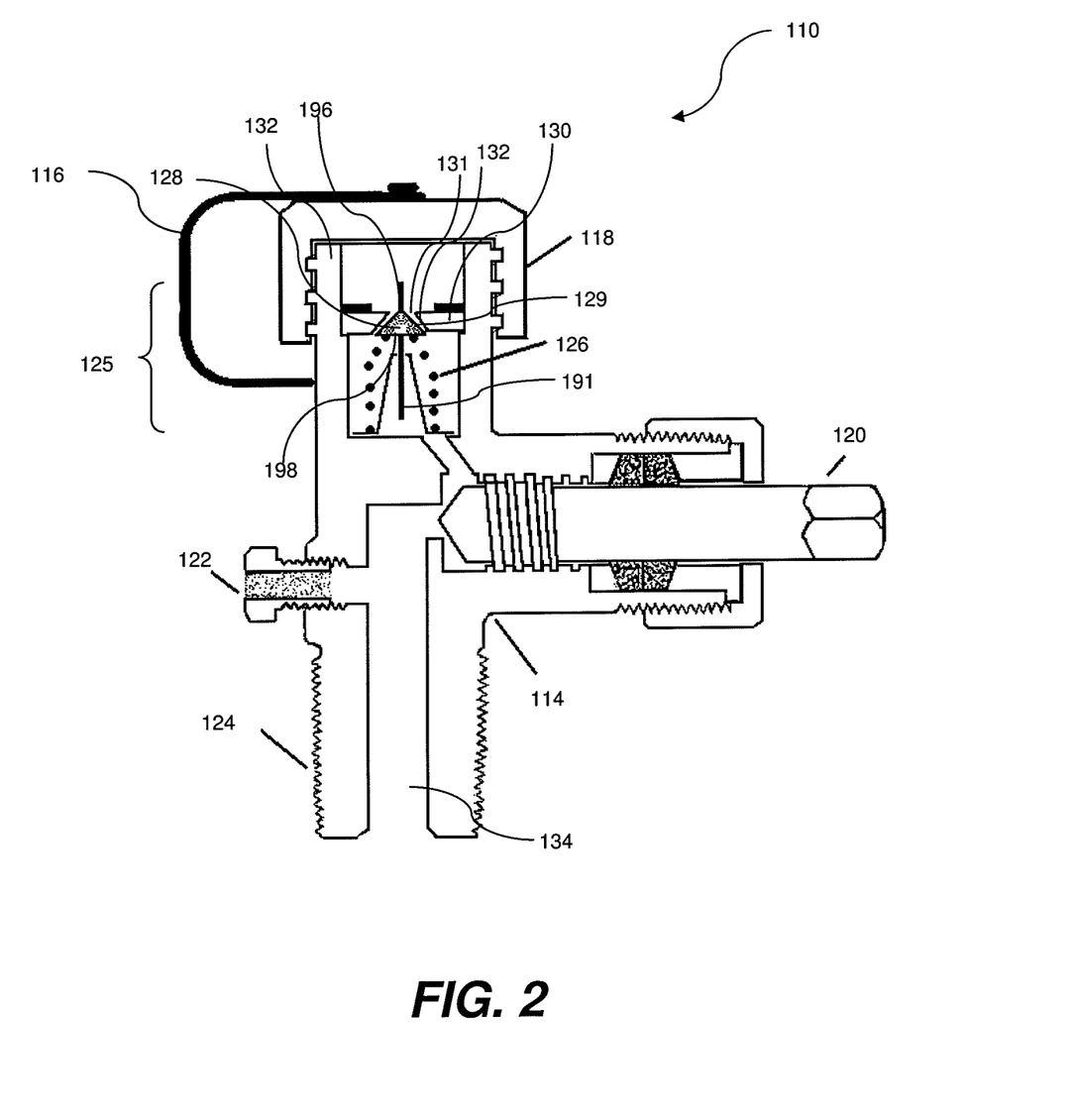
FIG. 2 is schematic illustration showing a cross-sectional view of a valve or valve assembly, in accordance with certain embodiments of the present invention.

FIG. 2 exemplarily illustrates another embodiment in accordance with some aspects of the invention. Valve assembly 110 can be coupled by way of tank connection 124 to a tank (not shown) containing contents to be delivered, from an interior volume thereof. In certain embodiments, valve assembly 110 can be coupled by way of tank connection 124 to a threaded port of the tank. Valve assembly 110 comprises valve body 114 having channel 134, which can be in communication with an interior volume of a tank (not shown) at first end of channel guide 192, and which can allow contents within the tank to be released. Valve body 114 can be constructed of any material suitable to allow the fluid from the cylinder to be delivered to the desired location, for example, to a source of wastewater. In certain embodiments, the valve housing or body can be made of materials used in conventional cylinder valves, such as aluminum silicon bronze.

Figure 4:
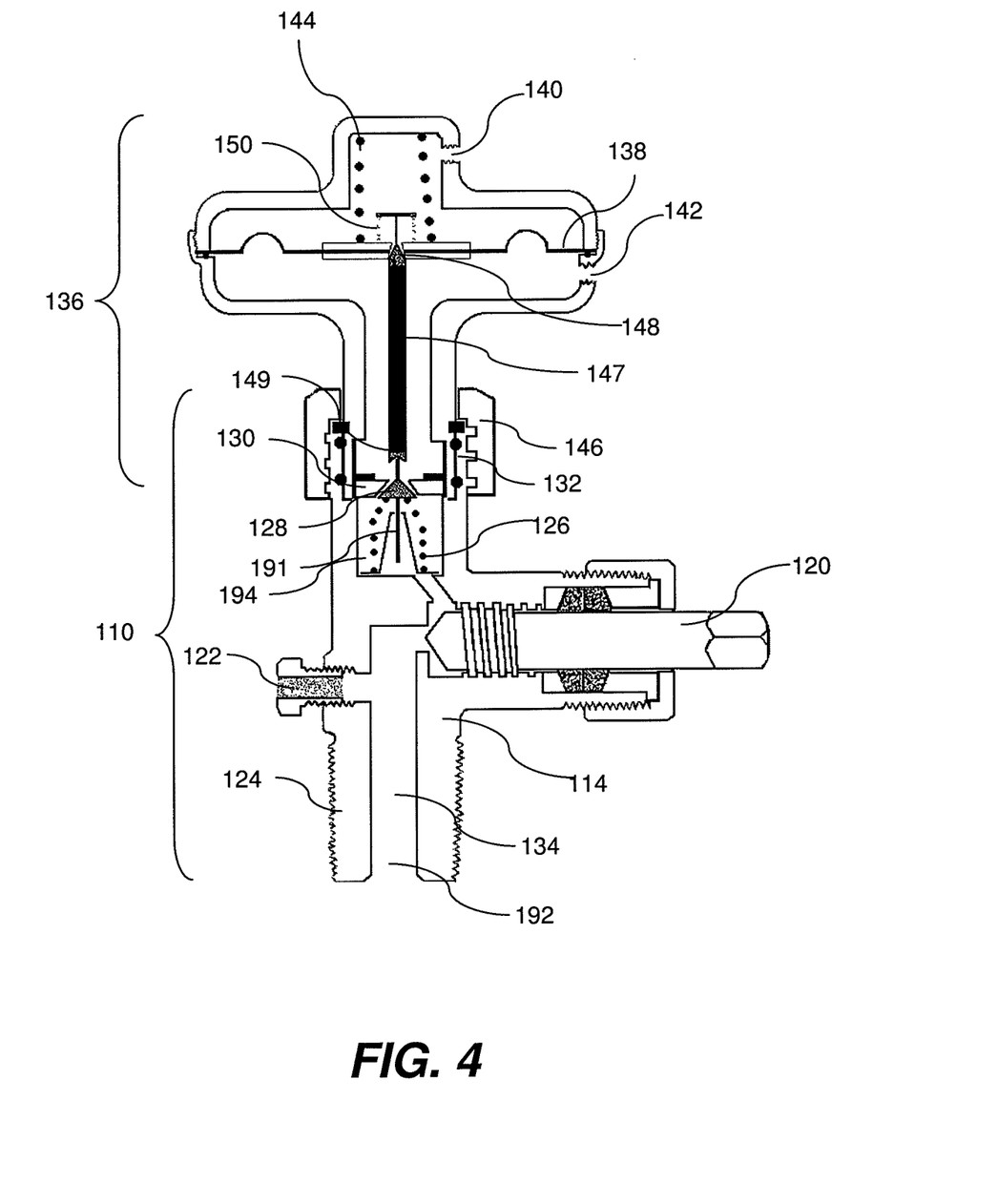
FIG. 4 is schematic illustration showing cross-sectional view of a valve and valve actuator assembly, in accordance with certain embodiments of the present invention.

Optional protective cap 118 covers coupling section 132 and at least partially protects the components within valve assembly 110, typically when the system is not in service. Optional cap retainer 116 is depicted and further provides protection of the components within valve assembly 110, and provides access to protective cap 118 when it is removed from coupling section 132. As shown in FIG. 4, coupling section 132 can be coupled to coupling section 146 of actuator 136. Valve assembly 110 also optionally comprises shut-off valve 120 which can be configured to fluidly isolate the interior of the tank from aperture 131. Optional fusible plug 122 provides an additional safety feature to valve assembly 110 in case of fire or an increase in temperature, wherein plug 122 can be a threaded plug with a hole drilled completely through its length to accommodate communication between the interior of the tank and a vent or release (not shown). This hole can be sealed with a metal or material of a predetermined melting point, that upon melting, will open the plug to allow a release of pressure from within the container to which valve assembly 110 can be coupled. In certain embodiments, the desirable range of melting points of the sealing material may be about 150° F. to about 170° F.

In one or more embodiments of the invention, the valve assembly can also comprises a regulating assembly 125 that can include seat assembly 130 having aperture 131 defined at least partially by aperture seating surface 133. The valve assembly can also comprise a seating member 128, for example a plug, comprising sealing surface 129, displacer head 196, and biasing end 198. The seating member can be held against the seat assembly using a biasing member, for example spring 126, that positions sealing surface 129 against aperture seating surface 133. In this position, the aperture 131 is fluidly isolated from channel 134, by the seating member. Regulation assembly 125 can be coupled to channel 134 at second channel end 194 that is distal from first channel end 192.

Figure 3:
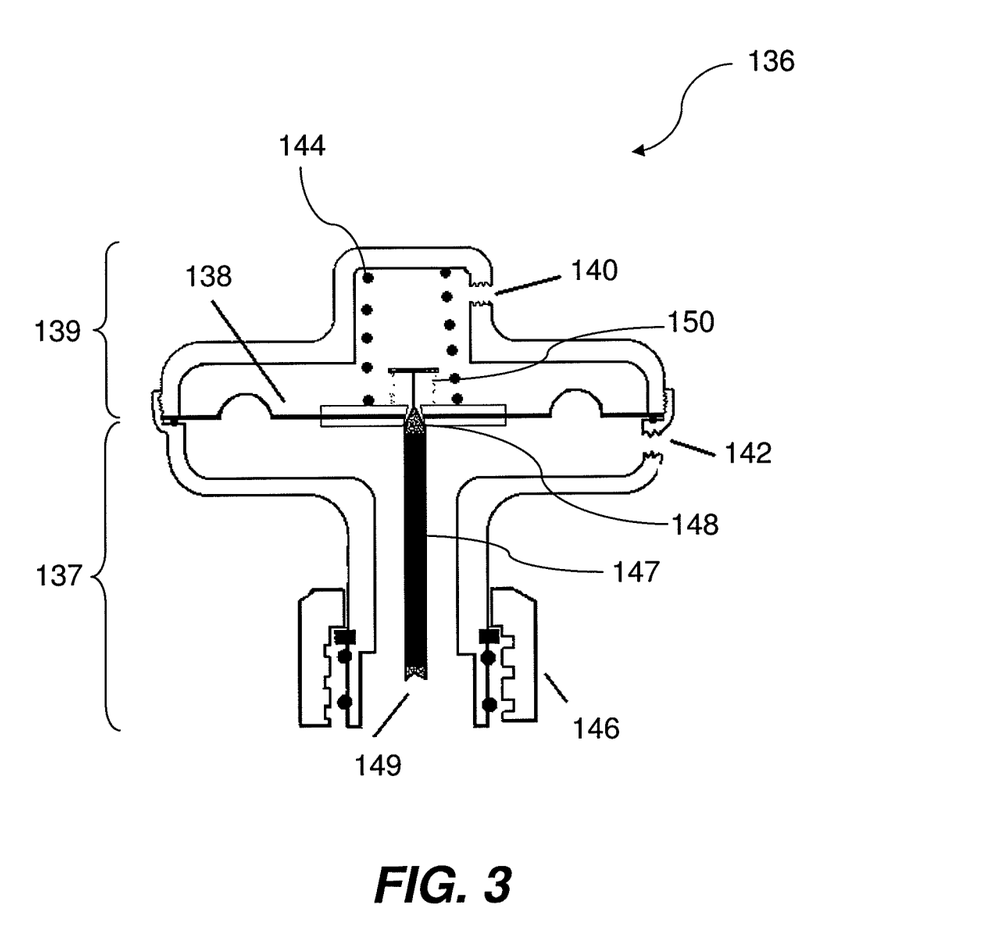
FIG. 3 is schematic illustration showing a cross-sectional view of a valve actuator, in accordance with certain embodiments of the present invention.

FIG. 3 exemplarily illustrates an actuator 136 in accordance with some aspects of the invention. Actuator 136 can be coupled by way of coupling section 146 to coupling section 132 of valve assembly 110 to facilitate delivery of a fluid from within a tank or cylinder that can, in turn, be coupled to valve assembly 110, as shown in FIG. 4. Actuator 136 typically comprises a diaphragm 138, which divides actuator 136 into first side 137 and second side 139. First side 137 of actuator 136 can be in fluid communication with one or more vacuum ports 142, while second side 139 can comprise one or more vents 140, which can be exposed to atmospheric pressure or in some cases, a pressure greater than the vacuum pressure applied at first side 137. Actuator 136 typically further comprises displacer 147 having first displacer end 148 and second displacer end 149. First displacer end 148 can be coupled to diaphragm 138 (as shown in FIGS. 3 and 4), while second displacer end 149 can be coupled to displacer head 196 of the seating member, for example, plug 128 (as shown in FIG. 4). As illustrated, displacer head can have a member extending from the seating member; other configurations of the invention, however, contemplate coupling the second displacer end to, for example, a mating surface of the seating member. The illustrated preferred embodiment exemplarily shows a first mating geometry at the displacer end 149 that is sized to receive a displacer head that has a configuration that complementarily mates with the first mating geometry. The vacuum source can have a vacuum pressure that is sufficient to overcome a biasing force of the biasing membrane.

Valve assembly 110 can also comprise guide member 191 which may allow linear displacement of the seating member along a guide axis. As illustrated, guide member 191 can comprise a rail slidably engageable within a slot, thereby confining translation of the seating member along a linear displacement axis.

Actuator 136 also typically comprises a biasing member, for example, spring 144, which can allow diaphragm 138 to move in a desired direction based on a pressure differential between first side 137 and second side 139. For example, if at least a partial vacuum is drawn from a vacuum source that can be connected to vacuum port 142 of first side 137, and second side 139 remains at atmospheric pressure, diaphragm 138 will move in a direction towards coupling section 146. Movement of diaphragm 138 in this direction will thereby move plug 128 in a predetermined distance away from sealing surface 129, allowing channel 134 of the aperture of valve assembly 110 to be in fluid communication with vacuum port 142. Displacement or unseating of the seating member away from the seat assembly allows the aperture 131 to define a flow path therethrough and be in fluid communication with the interior volume of the tank through channel 134. In this case a biasing member, for example spring 126, positions sealing surface 129 toward aperture seating surface 133, but not against it. In some embodiments, wherein aperture 131 defines a flow path therethrough, the flow path of aperture 131 is aligned along or at least parallel to a longitudinal axis of channel 134. Such a configuration can be realized when the guide member confines translation of the seating member along the linear displacement axis. Preferred configurations of the invention involve a coincident alignment of the linear displacement axis and the longitudinal axis.

The diaphragm can be constructed of any material suitable to allow the diaphragm to flex or move a desired amount in a desired direction based on a pressure differential between a first section and a second section of the valve actuator. The diaphragm can be constructed of any material suitable to move the diaphragm a desired amount and desired direction such that the plug can be unseated from the seat of the valve. For example the diaphragm can be constructed of polyvinylidene chloride (e.g., KYNAR®), polytetrafluoroethylene (e.g., TEFLON®), or poly(ethylene chlorotrifluoroethylene) (e.g., HALAR®).

Preferably, compositions of the various components of the various components, systems, and subsystems of the invention involve utilizing materials suitable for the anticipated service conditions. For example, wetted surfaces of a system that delivers chlorine preferably utilize corrosion-resistant metals, polymers, or composite materials.

Figure 5:
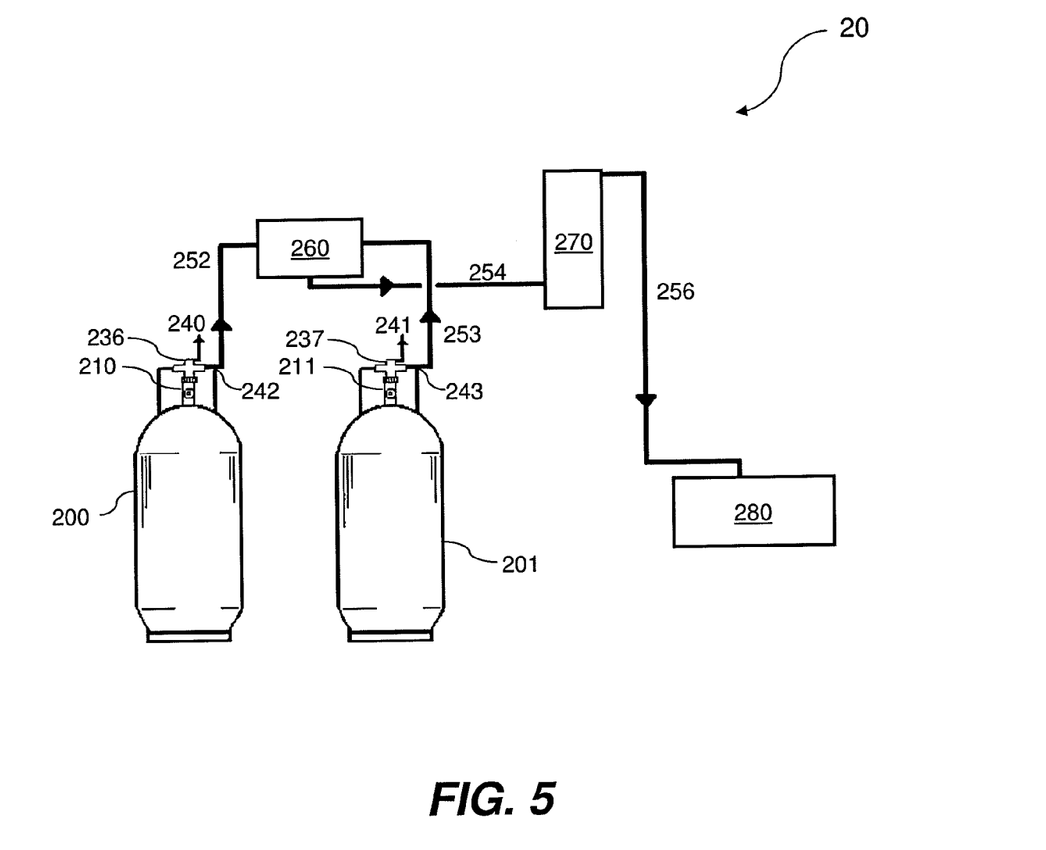
FIG. 5 is a schematic illustration showing an example of a fluid delivery system, in accordance with certain embodiments of the present invention.

FIG. 5 exemplarily illustrates another embodiment in accordance with some aspects of the invention. Fluid delivery system 20 comprises a source of fluid to be delivered, such as tank 200 containing a fluid to be delivered, and a flow regulating means, such as valve assembly 210, comprising components as discussed above with regard to FIG. 2, that is connected to a source of fluid to be treated. The flow regulating means can have a first configuration that fluidly isolates the source of fluid to be delivered from the vacuum source. In certain examples, flow regulating means comprises an aperture and a seating member that is disposed in the aperture while in the first configuration. In certain other examples, the flow regulating means can further comprise a biasing means that is configured to provide a retaining force directed to securing a sealing surface of the seating member against an aperture seating surface of the aperture. The fluid delivery system also can comprise an actuating means, for example actuator 236, comprising components as discussed above with regard to FIG. 3, which is coupled to valve assembly 210. The actuating means can have a diaphragm operatively coupled to and capable of reconfiguring the flow regulating means into a second configuration that creates a flow path fluidly connecting the source of fluid to be delivered to the vacuum source. In certain examples, the second configuration is effected upon deformation of the diaphragm into a displacing arrangement that creates a linear displacement which unseats the seating member from the sealing surface of the aperture. Vacuum port 242 can be fluidly connected to vacuum source 280. As shown in FIG. 5, vacuum port 242 is typically connected to vacuum source 280 by way of vacuum line 252, flow switching valve 260, vacuum line 254, flow meter 270, and vacuum line 256.

Auto switch-over valve 260 can allow automatic switching of the fluid connection to second tank 201 and valve assembly 211 comprising components as discussed above with regard to FIG. 2. Actuator 237, comprising components as discussed above with regard to FIG. 3, is coupled to valve assembly 211. Vacuum port 243 is connected to vacuum source 280 by way of vacuum line 253, auto switch-over valve 260, vacuum line 254, flow meter 270, and vacuum line 256. A switch-over to tank 201 can occur when it has been detected that the supply of fluid from the first cylinder has been at least partially depleted. The switch-over can be initiated by a predetermined change in the vacuum level. In certain embodiments, for example, the switch-over can be initiated by a predetermined increase in the vacuum level. A Wallace & Tiernan® Series 55-410 Remote Vacuum Switchover device can be used in this embodiment, from Siemens Water Technologies Corp.

Figure 6:
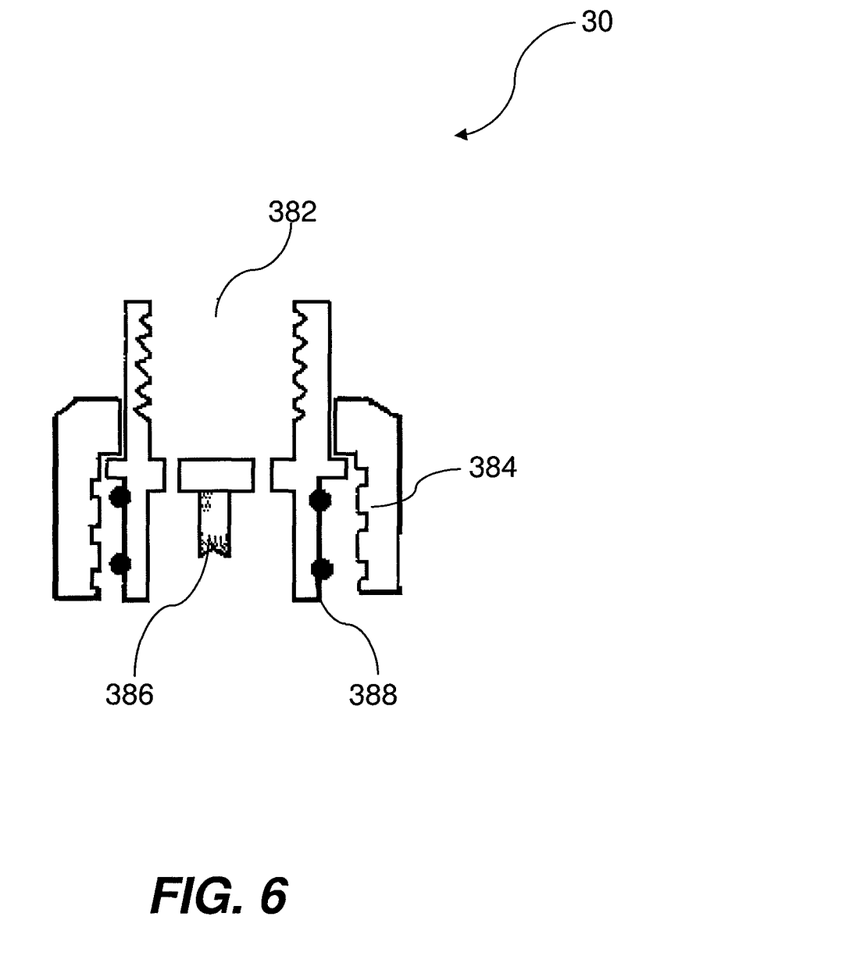
FIG. 6 is schematic illustration showing a cross-sectional view of a filling adapter, in accordance with certain embodiments of the present invention.

FIG. 6 exemplarily illustrates another embodiment in accordance with some aspects of the invention. An adapter 30 can be coupled to a valve assembly to allow for refilling of the cylinder with a desired fluid. The adapter can have a first end that can be coupled to the valve, and a second end that can be coupled to a source of a fluid to be added to the container. The fluid may be added to the cylinder, through the adapter in a liquid or gaseous form. Filling adapter 30 comprises port 382 that can be fluidly connectable to a source of a fluid to be added to a tank (not shown). Adapter 30 can be coupled to a tank using coupling section 384. Seal 388 can be used to assist in assuring a secure connection between coupling section 384 and (for example, coupling section 132) of the tank (not shown).

Some aspects of the invention can involve a method of delivering fluid from a tank. Valve assembly 110 and actuator 136 can be provided as described above in FIGS. 2-4, wherein channel 135 is in communication with an interior volume of a tank. Once valve assembly 110 and actuator 136 have been secured to a tank, a vacuum source can be connected to vacuum port 142 of actuator 136. Subsequently, a differential pressure between first side 137 of diaphragm 138 and opposite side or second side 139 of diaphragm 138 is created, thereby linearly displacing displacer 148 along a displacement axis and further displacing sealing surface 129 of seat assembly 130 from against aperture seating surface 133. In certain examples, the method may further comprise measuring a flow rate of fluid from the tank to the vacuum source.

One or more further aspects of the present disclosure are directed to a method of assembling a vacuum actuated valve. The method can comprise providing valve body 114 as shown in FIGS. 2 and 4, and securing seat assembly 130 in valve body 114. The method can further comprise securing seating member 128 in valve body 114, and providing biasing member 144. The method can further comprise coupling seating member 128 at biasing end 198 thereof to a first mounting end of biasing member 144, and installing biasing member 144 in valve body 114 in a configuration that creates a biasing force directed to seating member 128 along a direction that positions sealing surface 129 of seating member 128 along aperture seating surface 133. The method can further comprise providing actuator 136 as shown in FIGS. 3 and 4, coupling displacer 147 at first displacer end 148 to diaphragm 138; and coupling displacer 147 at second displacer end 149 to displacer head 196 of seating member 128.

One or more further aspects of the present invention are directed to a method for retrofitting a tank comprising installing valve assembly 110 as shown in FIGS. 2 and 4, into a port of the tank, and then coupling actuator 136 to valve assembly 110 as shown in FIG. 4.

In certain embodiments, a controller can facilitate or regulate the fluid delivery system. For example, a controller may be configured to adjust the level of vacuum being applied to the system.

The controller may respond to signals from timers (not shown) and/or sensors (not shown) positioned at any particular location within the fluid delivery system. The one or more sensors may monitor one or more operational parameters such as pressure, temperature, one or more characteristics of the fluid, and/or one or more characteristics of the vacuum streams. The controller may respond by generating a control signal causing one or more conditions of the system to be altered.

The controller may be implemented using one or more computer systems which may be, for example, a general-purpose computer such as those based on in Intel PENTIUM®-type processor, a Motorola PowerPC® processor, a Hewlett-Packard PA-RISC® processor, a Sun UltraSPARC® processor, or any other type of processor or combination thereof. Alternatively, the computer system may include specially-programmed, special-purpose hardware, for example, an application-specific integrated circuit (ASIC) or controllers intended for fluid delivery systems.

The computer system can include one or more processors typically connected to one or more memory devices, which can comprise, for example, any one or more of a disk drive memory, a flash memory device, a RAM memory device, or other device for storing data. The memory is typically used for storing programs and data during operation of the system. For example, the memory may be used for storing historical data relating to the parameters over a period of time, as well as operating data. Software, including programming code that implements embodiments of the invention, can be stored on a computer readable and/or writeable nonvolatile recording medium, and then typically copied into memory wherein it can then be executed by one or more processors. Such programming code may be written in any of a plurality of programming languages, for example, Java, Visual Basic, C, C#, or C++, Fortran, Pascal, Eiffel, Basic, COBAL, or any of a variety of combinations thereof.

Components of the computer system may be coupled by one or more interconnection mechanisms, which may include one or more busses, e.g., between components that are integrated within a same device, and/or a network, e.g., between components that reside on separate discrete devices. The interconnection mechanism typically enables communications, e.g., data, instructions, to be exchanged between components of the system.

The computer system can also include one or more input devices, for example, a keyboard, mouse, trackball, microphone, touch screen, and other man-machine interface devices as well as one or more output devices, for example, a printing device, display screen, or speaker. In addition, the computer system may contain one or more interfaces that can connect the computer system to a communication network, in addition or as an alternative to the network that may be formed by one or more of the components of the system.

According to one or more embodiments of the invention, the one or more input devices may include sensors for measuring any one or more parameters of the fluid delivery system and/or components thereof. Alternatively, the sensors and/or other components may be connected to a communication network that is operatively coupled to the computer system. Any one or more of the above may be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms may be affected by utilizing any suitable technique including but not limited to those utilizing wireless protocols.

The controller can include one or more computer storage media such as readable and/or writeable nonvolatile recording medium in which signals can be stored that define a program to be executed by one or more processors. The medium may, for example, be a disk or flash memory. In typical operation, the one or more processors can cause data, such as code that implements one or more embodiments of the invention, to be read from the storage medium into a memory that allows for faster access to the information by the one or more processors than does medium.

Although the computer system is described by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by a controller can be performed in separate computers, which in turn, can be communication through one or more networks.

Further aspects of the invention can involve or be directed to computer-readable media, or providing computer-readable media, that facilitates the various features of the delivery system described herein.

Use of ordinal terms such as "first," "second," "third," and the like in the specification and claims to modify an element does not by itself connote any priority, precedence, or order of one element over another or the temporal order in which acts of a method are performed, but are used merely as labels to distinguish one element having a certain name from another element having a same name, but for use of the ordinal term, to distinguish the elements.

What is claimed is:

1. An assembly for delivering fluid from a tank, comprising:
   a tank;
   a vacuum source;
   a vacuum actuated tank valve assembly detachably coupled directly to a port of the tank, the vacuum actuated tank valve assembly having
      a channel in communication with an interior volume of the tank at a first channel end of the channel; and
      a regulating assembly coupled to the channel at a second channel end that is distal from the first channel end, the regulating assembly having
         a seat assembly having an aperture defined by an aperture seating surface;
         a seating member having a sealing surface, a displacer head, and a biasing end that is distal from a displacer end; and
         a biasing member coupled to the seating member at the biasing end thereof, the biasing member disposed to position the sealing surface of the seating member against the aperture seating surface of the seat assembly, and fluidly isolate the aperture from the channel;
   an actuator detachably coupled to the vacuum actuated tank valve assembly, the actuator having
      a vacuum port connectable to the vacuum source, and capable of being in fluid communication with the channel through the aperture; and
      a diaphragm having
         a first side in communication with the vacuum port; and
         a displacer having the first displacer end and a second displacer end, the displacer coupled at the first displacer end to the diaphragm, the displacer further coupled at the second displacer end to the displacer head of the seating member; and
   a removable cap detachably coupled to the vacuum actuated tank valve assembly and configured to protect components of the vacuum actuated tank valve assembly when the delivery assembly is not in operation,
   wherein the assembly is constructed and arranged such that the vacuum source creates a differential pressure between the first side of the diaphragm and an opposite side of the diaphragm thereby linearly displacing the displacer along a displacement axis and further displacing the sealing surface of the seat assembly from against the aperture seating surface when connected to the vacuum source to define a flow path to deliver fluid from the tank along the channel.

2. The system of claim 1, further comprising a shut off valve configured to fluidly isolate the interior of the tank from the aperture.

3. The system of claim 2, wherein the aperture defines a flow path therethrough, and wherein the flow path of the aperture is aligned along a longitudinal axis of the channel.

4. The system of claim 3, further comprising a flow meter capable of fluidly connecting the vacuum source and the vacuum port.

5. The system of claim 4, wherein the tank contains one of chlorine, sulfur dioxide, carbon dioxide, and ammonia.

6. The system of claim 5, wherein the first channel end comprises a threaded connector coupled to a threaded port of the tank.

7. The system of claim 6, wherein the valve assembly further comprises a guide member configured to allow linear displacement of the seating member along a guide axis.

8. The assembly of claim 1, wherein the biasing member is configured to provide a retaining force directed to securing the sealing surface of the seating member against the aperture seating surface of the aperture in a first configuration to fluidly isolate the source of fluid to be delivered from the vacuum source.

9. The assembly of claim 8, wherein the diaphragm is configured to be deformed into a displacing arrangement that creates a linear displacement which unseats the seating member from the seating surface of the aperture in a second configuration to create a flow path fluidly connecting the source of fluid to be delivered to the vacuum source.

* * * * *